United States Patent [19]

Hollis, Jr.

[11] Patent Number: 4,509,002

[45] Date of Patent: Apr. 2, 1985

[54] PRECISION X-Y POSITIONER

[75] Inventor: Ralph L. Hollis, Jr., Yorktown Heights, N.Y.

[73] Assignee: International Business Machines Corporation, Armonk, N.Y.

[21] Appl. No.: 563,334

[22] Filed: Dec. 20, 1983

[51] Int. Cl.³ .............................................. G05B 19/40
[52] U.S. Cl. .................... 318/687; 318/571; 318/640; 318/135
[58] Field of Search ............... 318/687, 571, 640, 685, 318/696, 38, 135; 356/358

[56] References Cited

U.S. PATENT DOCUMENTS

| Re. 27,289 | 2/1972 | Sawyer | 318/38 |
|---|---|---|---|
| 3,457,482 | 7/1969 | Sawyer | 318/38 |
| 3,735,231 | 5/1973 | Sawyer | 318/687 |
| 3,867,676 | 2/1975 | Chai et al. | 318/135 |
| 3,955,486 | 1/1976 | Nagashima | 310/12 |
| 4,286,197 | 8/1981 | Eberhard et al. | 318/38 |
| 4,319,189 | 3/1982 | Cullum, Jr. et al. | 324/208 |
| 4,455,512 | 6/1984 | Cornwell et al. | 318/135 |

OTHER PUBLICATIONS

Application Note 197-2, Laser and Optics, 5501A Laser Transducer, Hewlett-Packard Corp., 1501 Page Mill Rd., Palo Alto, Cal., Hereinafter referred to as–Hewlett-Packard–(1980).
Ralph L. Hollis, "Geometric Design Processor (GDP) for Assembly Modeling: Fine Positioner Assembly Sequence", (July 30, 1984).

*Primary Examiner*—B. Dobeck
*Assistant Examiner*—Saul M. Bergmann
*Attorney, Agent, or Firm*—Carl C. Kling

[57] ABSTRACT

Suspending an armature on a parallelopiped basket of flexure springs, with a lateral effect cell position sensor and an X-Y source of motive power, provides a precision X-Y positioner with minimum static friction and with feedback of actual position for closed loop servo operation under computer control. The armature is arranged for X-Y motion within its own plane, and is arranged to carry a gripper, cutting tool, or other end effector. The parallelopiped basket includes a stator, a first set of flexure springs, a flexure spring carrier mounted on the first set of flexure springs, a second set of flexure springs mounted on the flexure spring carrier, and the armature mounted on the second set of flexure springs in turn mounted on the carrier. The basket suspends the armature with freedom of motion in the X and Y dimensions without static friction associated with sliding or rolling motions. Motive power to reposition the armature to the desired X-Y coordinates is provided by a positioning motor made up of a pair of U-shaped permanent magnets each having coil-wrapped U-shaped pole pieces mounted orthogonally to each other. Once the armature is positioned, flux differentials applied to teeth on the armature oppose any forces tending to move the armature from the desired X-Y coordinates.

Armature position sensing is by LED on the armature and a lateral effect cell, mounted on the stator, which feeds back sensing signals to a computer to form a servo loop. The computer can vary the compliance of the flexure springs by adjusting the motor control signals as a function of a compliance variable.

6 Claims, 7 Drawing Figures

PRECISION X-Y POSITIONER

BACKGROUND OF THE INVENTION

1. Field of the Invention

This invention relates to electromagnetic precision positioners operable to provide precision positioning capability to a robot and effector, and more particularly relates to an electromagnetically powered X-Y positioning device which operates without static friction, with power, with precise control of position, with positional feedback and with variable controllable compliance.

2. Description of Related Art

The need for precision positioning is well known in a number of mechanical and electronic arts. Close tolerance machining, for example, requires that the tool be positioned exactly. Various mechanisms for accomplishing such positioning, and various techniques for getting the most out of such mechanisms, are known.

A known mechanism for accomplishing precision positioning within a plane is the use of a linear motor to drive and hold a device in a particular position. Such linear motors, as well as electromechanical stepping motors, hydraulic actuators, and other mechanisms are known for use in precision positioning.

A typical solution to the need for high precision motion, in a plane of scanning for a robot and effector, is to provide a pair of linear actuators mechanically connected in tandem so that the Y-actuator is physically carried at the end of the X-actuator. A disadvantage of this approach is that the Y and X stages are mechanically in series; the Y stage moves the payload, but the X stage must move both the Y stage and the payload. Symmetry is broken, and in critical applications the control strategies for the X stage and the Y stage must be different for the different dynamics involved.

RELATED PRIOR ART PATENTS

U.S. Pat. No. 3,457,482, Sawyer, MAGNETIC POSITIONING DEVICE, July 22, 1969, shows a head incorporating two parallel sets of magnets along each of two perpendicular axes, with driving circuitry for selectively energizing the magnet coils.

U.S. Pat. No. 3,735,231, Sawyer, LINEAR MAGNETIC DRIVE SYSTEM, May 22, 1973, shows an orthogonal linear motor mechanism, for moving a head about a platen, with a servo loop for precision control of position.

U.S. Pat. No. 3,867,676, Chai et al, VARIABLE RELUCTANCE LINEAR STEPPER MOTOR, Feb. 18, 1975, shows a variable reluctance linear stepping motor with a special set of windings in series aiding relationship.

U.S. Pat. No. 3,935,486, Nagashima, FINELY ADJUSTABLE TABLE ASSEMBLY, Jan. 27, 1976, shows an electromechanically adjustable table assembly in which the table is suspended by oval, flat springs and positioned electromagnetically.

U.S. Pat. No. 4,286,197, Eberhard et al, TWO-COORDINATE POSITIONING DEVICE, Aug. 25, 1981, shows a two-coordinate tool positioning device having orthogonal linear motors.

U.S. Pat. No. 4,455,512, Cornwell et al, June 19, 1984, SYSTEM FOR LINEAR MOTOR CONTROL, shows a feedback system for table positioning.

U.S. Pat. No. Re. 27,289, Sawyer, MAGNETIC POSITIONING DEVICE, Feb. 15, 1972, shows a precision positioner having two U-shaped soft iron pole pieces, each wound with copper wire, biased with fields produced by a permanent magnet. In the absence of coil current, magnetic flux links the two pole pieces, symmetrically dividing between the left and right legs of each pole piece, forming a closed path through the air gaps and soft iron armature. Induced fields in the pole pieces add or subtract from the bias fields and provide positioning impetus to an armature. The Sawyer motor shows a two-dimensional linear positioner based on permanent magnet flux steering, using a pair of magnets arrayed asymmetrically to achieve within a single step limited two-dimensional linear motion over a restricted displacement.

Application Note 197-2, "Laser and Optics," 5501A Laser Transducer, Hewlett-Packard Corp., 1501 Page Mill Road, Palo Alto, Calif., 1980, pp. 32–33, 41–43, shows a technique for sensing table position optically.

DISADVANTAGES OF THE PRIOR ART

In the prior art, fine positioners tend to require sliding motion planar mechanisms, or wheeled carriages, to allow the multidimensional motions required to position the end effector as desired. Such fine positioners tend to be heavy because of the multiple coils and associated magnet armatures. This heaviness causes the fine positioners to be slow in response, subject to wear problems, and in need of frequent lubrication, adjustment and repairs.

Even a cantilevered fully-suspended platform positioner such as described by Nagashima does not resolve all problems of excess mass, and susceptability to oscillation. Nagashima's response to the oscillation problem, damping in silicon oil, slows the response and makes it difficult to operate in attitudes other than horizontal.

In the prior art fine positioners of the linear motor type, the position of the armature may be estimated as a function of the current, but the actual position of the armature cannot accurately be determined under conditions of varying load and varying dynamics.

The need persists for a strong, durable precision positioning device which does not suffer the problems associated with static friction inherent in sliding and wheeled carriages, which provides actual position feedback necessary for closed loop servo positioning, and which needs no complicated damping or compliance mechanisms.

SUMMARY OF THE INVENTION

The precision X-Y positioner provides two-dimensional precision motion using a two-dimensional electromagnetic actuator, with X stage and Y stage acting in parallel, maintaining symmetry and offering the advantage of identical strategy for the X stage and the Y stage. The two-dimensional actuator is a linear stepping motor based on permanent magnet flux steering, using two U-shaped permanent magnets, each with two soft iron coil-wrapped U-shaped pole pieces, and a soft iron armature. The armature is mounted for free movement in X and Y directions in its own plane, with respect to a stator in a reference plane parallel to the plane of the armature. The armature is suspended for friction-free X-Y movement, and is arranged to carry a gripper, chuck, cutting tool, or other end effector. The armature, suspended by a basket or box of flexure springs and spring carriers, is free to move within its own plane to the desired X-Y coordinates. The pole pieces on each magnet are mounted orthogonally to each other and at 45 degrees to the axis of the magnet. Control currents applied to the coils on the pole pieces provide motive power to reposition the armature. One magnet suffices to provide both X and Y forces, but the use of two magnets avoids the imbalance of forces which might cause rotational motion. Electromotive force differentials applied to the armature, by means of a servo loop, oppose any forces tending to move the armature from the desired X-Y coordinates.

An object of the invention is to provide precision positioning, for the end effector of a robot, without encountering the problem of static friction which is inherent in sliding planar mechanisms and wheeled carriages.

Another object is to provide a robust precision positioner which is easy to manufacture and to service.

Another object of the invention is to provide a variable compliance function to a precision positioner, the variability of the compliance (resistance to motion) being subject to operator control via the control computer and applied electrical signals.

A feature of the invention is its use of orthogonally positioned pole pieces on a magnet so as to provide a two-dimensional positioner motor, together with a friction-free suspension for the motor armature so as to eliminate static friction entirely.

Another feature of the invention is the use of non-contact two-dimensional position sensors which do not add undue mass to critical moving parts.

Another feature of the invention is its variable compliance capability, that is, its variable resistance to repositioning forces, without the requirement of physical change of springs or mechanical adjustment.

An advantage of the invention is that it permits positioning of a tool with precision in the sub-micron range.

Another advantage of the invention is its capability of being remotely set for compliance, and remotely set for either open loop or for closed loop positioning, under computer control, thus accommodating complex and position-related compliance and damping algorithms without mechanical adjustment.

The foregoing and other objects, features and advantages of the invention will be apparent from the more particular description of the preferred embodiments of the invention, as illustrated in the accompanying drawings.

DESCRIPTION OF THE PREFERRED EMBODIMENT

Figure 1:
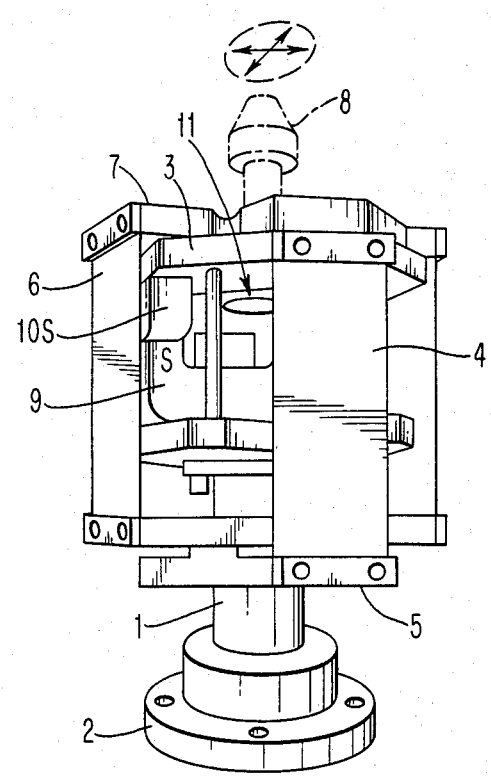
FIG. 1 is a side elevation diagram of an electromagnetic precision X-Y positioner according to the invention.

FIG. 1 shows the precision positioner abbreviated in detail for ease of description. Support post 1 is solidly mounted in bracket 2, which may be in turn mounted on a movable gross positioning device such as a robot arm or machine tool, or may be solidly mounted to a table. Solidly mounted at the top of support post 1 is a stator 3, which defines a reference plane from which motions may be defined. Stator 3 has mounted to it two parallel flexure springs 4, which extend downward from the stator to a spring carrier 5, which has a central relief aperture to allow limited free movement of spring carrier 5 about support post 1. A second set of flexure springs 6, in parallel planes normal to the planes of flexure springs 4, extend upward from the spring carrier 5 to armature 7. This fixes the armature against Z-motion (motion normal to the reference plane), and also against any rotation, but allows free X and Y motion in its own plane, parallel to the reference plane. A tool holding chuck 8 or other fixtures may be mounted on the armature 7. Permanent magnet 9 is mounted securely to stator 3; the permanent magnet 9 has two orthogonal U-shaped pole pieces (10S shown; 10N obscured) respectively mounted at its S and N poles. The pole pieces are fitted with coils of insulated copper wire protected by epoxy resin. The permanent magnet, pole pieces and coils function as the stator of the X-Y positioning motor. A lateral effect cell 11 operates to provide continuous X-Y position indications for the armature 7 with respect to stator 3.

Figure 2:
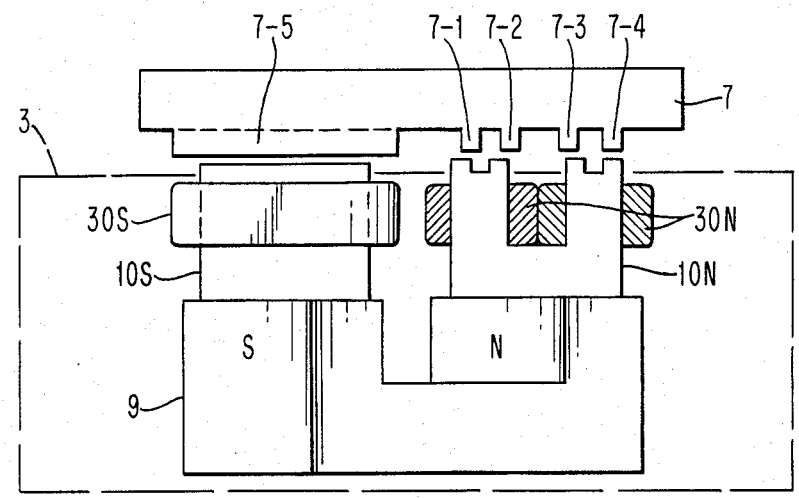
FIGS. 2 and 3 show the orthogonal positioning of the magnet pole pieces and coils on the 45 degree angled U-shaped magnet. These provide motive power to the positioning motor of the precision X-Y positioner of FIG. 1.
Figure 3:
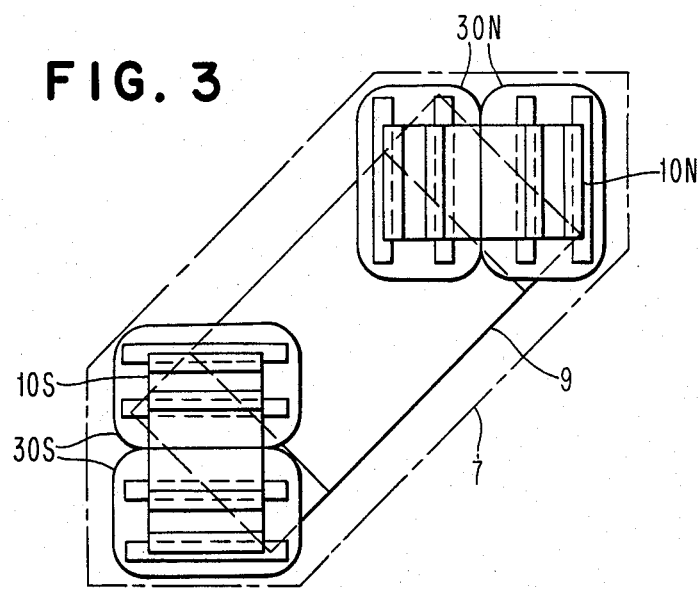

FIGS. 2 and 3 illustrate the X-Y motor. Stator 3, made up of permanent magnets 9 with their pole pieces 10S and 10N and associated windings 30S and 30N, provides flux differentials at teeth (7-1, 7-2, 7-3, 7-4 and 7-5 shown) of armature 7, providing motive power in both the X and Y dimensions at the same time. Pole pieces 10S and 10N are set orthogonal to each other, and at 45 degree angles to the axis of their permanent magnet 9. Armature 7 is positioned appropriately for the positioning of pole pieces 10S and 10N so that vector X-Y motions may be impressed on armature 7 with respect to the fixed platform base and magnet 9. In practice, two magnets are used so as to provide balanced magnetomotive forces.

Figure 4:
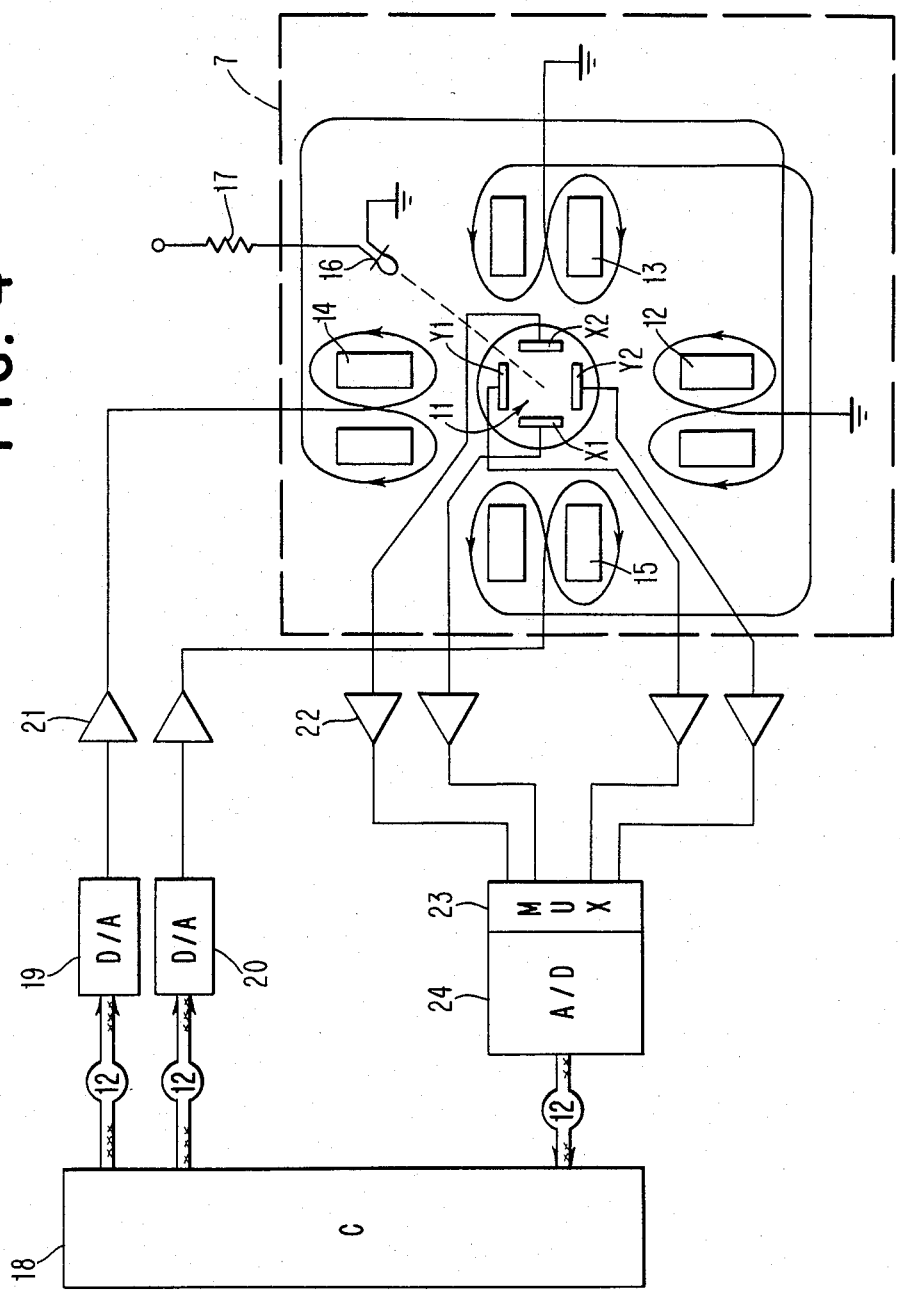
FIG. 4 is a semidiagrammatic presentation of the electronics and power electric circuits of the precision positioner of FIG. 1.

FIG. 4 shows the relationship between the armature, the magnet pole pieces and associated coils, the computer and the position sensor. Lateral effect cell 11 serves as the position sensor for the armature, providing unbalanced current signals related to the instantaneous position of a light emitting diode (LED) 16 located on the armature, defining a beacon point in the reference plane. The computer accepts these position signals from the position sensor, calculates motions required to move from instantaneous position to desired position, and sends motion control signals back to motor coils 30S and 30N as required to cause movement of the armature to the desired position. Lamp 16, provided with current via circuitry 17, provides positioning information with respect to the relative positions of the beacon point of the armature and of the beacon point of the stator 3. The position sensor sender (LED 16) and lateral effect cell 11 in theory could be interchangeably positioned on armature 7 and stator 3; in practice the LED, being of smaller mass and requiring fewer wire connections, is placed on the armature. Lateral effect cell 11 has four electrodes arranged in a square. When the spot of light from LED 16 is centered among the electrodes, the lateral effect cell provides balanced position currents. As the light from LED 16 (which preferably is infrared) moves between the electrodes, the electrodes provide unbalanced location current signals to the computer 18. This new instantaneous position signal is carried via circuitry including amplifier 22, multiplexer 23 and analog-to-digital converter 24. Computer 18 calculates the required control effort from the desired new location, and provides the required motion control signals via digital-to-analog converters 19, 20 and interconnecting circuitry including amplifier 21. Motion of the armature is accordingly provided, and a new instantaneous position signaled by position sensor 11.

Figure 5:
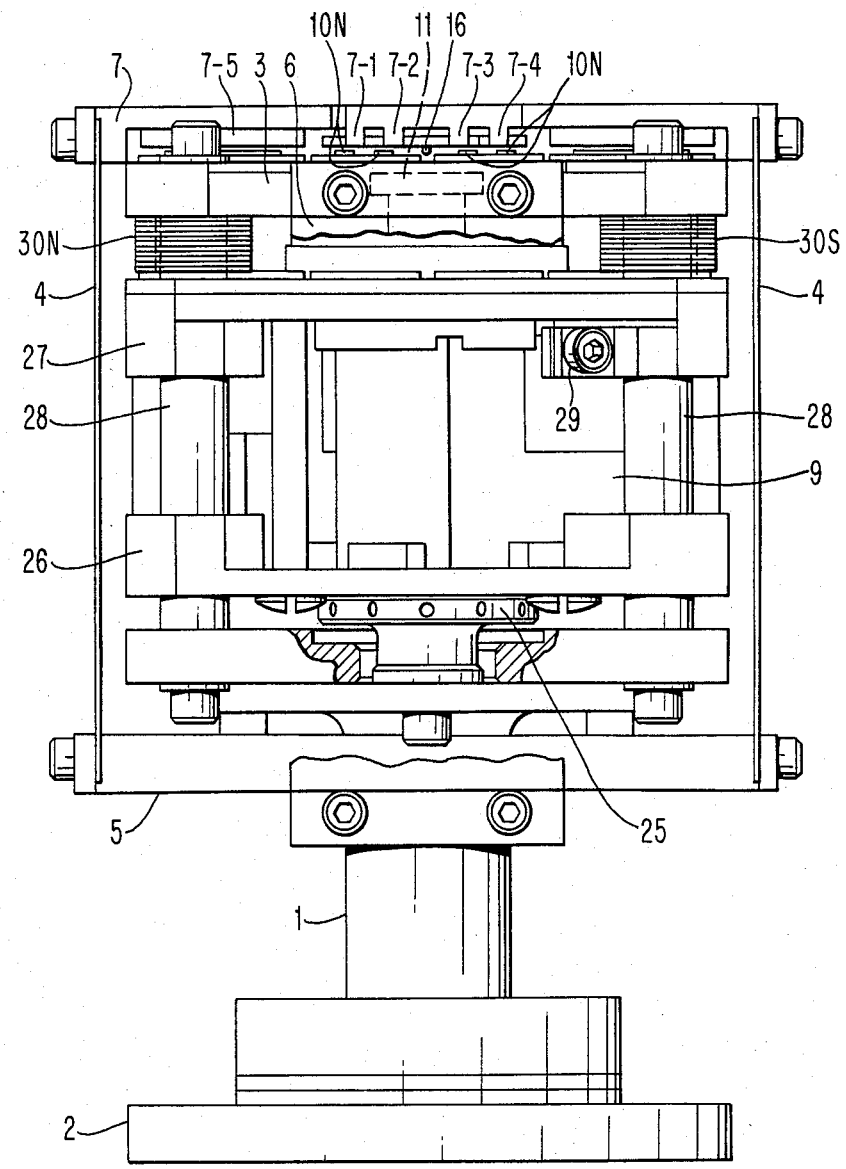
FIG. 5 is a detailed side elevation section view of the precision positioner shown in FIG. 1.

FIG. 5 illustrates details of the preferred embodiment. Support post 1 and bracket 2 support basket support means including stator 3, flexure springs 4, spring carrier 5, flexure springs 6 and armature 7. Teeth 7-1, 7-2, 7-3 and 7-4 are juxtaposed (with clearance of tens of microns) above pole pieces 10N of stator 3. Beacon LED 16 on armature 7 provides a position signal via lateral effect cell 11.

Coils 30N and 30S provide positioning power as a function of position control signals from computer 18 (FIG. 4).

Adjustment mechanism 25 provides vertical adjustment to the magnet assembly to provide correct clearance between armature 7 and stator 3. Rotating the capstan of adjustment mechanism 25 on its threaded post repositions magnet assembly platforms 26 and 27. These magnet assembly platforms slide on magnet assembly support rods 28 as driven by adjustment mechanism 25. Magnet assembly locking clamp screw 29 retains the adjustment.

CONTROL OF PRECISION POSITIONER

Closed-loop control of the precision positioner can be achieved using analog or digital circuits, by a computer, or combination of these methods. In the preferred embodiment, the control law is specified in a programmed algorithm executing in a microcomputer. This makes the control law easily adaptable to the application, and dynamically alterable during operation of the fine positioner. Various control laws may be used, as are well known in the art. For example, a PID (Proportional Integral Derivative) law of the form:

$$U = Ke + K_i \int e\,dt + K_d(de/dt)$$

or its discrete time equivalent can be used. Here, U is the control effort applied to the motor, e is the position error (desired position-actual position), and K, $K_i$, and $K_d$ are gain coefficients which respectively multiply the error, the time integral of the error, and the time derivative of the error. These gains are chosen to maximize performance in a given application, subject to stability criteria.

The above control law is illustrative. Other control laws, known in the art, which are based on sampling theory can be used to advantage.

DESCRIPTION OF HOW THE MOTOR WORKS

The motor differs from the known linear positioners, such as that of Sawyer, in that a single magnet, with one pole piece normal to the other, provides both X-motion and Y-motion. (Theta motion is undesirable in this embodiment.)

Referring to FIG. 3, a permanent magnet 9 (which can be Alnico or rare-earth or other magnetic material) provides a bias field. Magnetic flux passes through magnetically soft pole pieces 10S and 10N, dividing equally through the two legs of each pole piece. Several teeth provided in the pole pieces and armature serve to increase the available force. In the absence of current in the coils 30N and 30S, the armature assumes a neutral position, supported by the spring flexures. Coils 30N are wound with opposite sense on the two legs of the pole piece 10N; similarly for 30S and 10S. Current flowing through the coils 30N induces a magnetic flux which adds to and subtracts from the permanent magnet flux in the two legs of pole piece 10N, causing the armature to be attracted to the right or left, depending on the sign of the current. The armature is free to move under the restoring force provided by the spring flexures; thus a motion is generated whose value is proportional to the algebraic value of current flowing in the coils. The same relationship holds for pole piece 10S and coils 30S, except the armature motion would be in and out of the plane of the paper in the view shown. The teeth on the north and south pole pieces are arranged orthogonal to each other, so motions due to coils 30S and 30N are independent.

LATERAL EFFECT CELL

Lateral effect cells (position sensing photodiodes) are well-known in the art, and are commercially available. The lateral effect cell is a planar photodiode which reacts to a beacon light to provide electrical signals as a function of the location of the spot of light from the beacon. In the preferred embodiment, the beacon light is a lamp 16 mounted on the armature. The lateral effect cell 11 is square, and the position of the small spot of light on the surface of the lateral effect cell is determined by measuring the generated photocurrents in four electrodes arranged on the periphery of the square active surface of the lateral effect cell. The two primary measuring directions may be denoted X and Y. Then electrodes X1 and X2, whose principal axes are perpendicular to the X measuring direction, are used to measure the X position of the light spot; similarly for Y. The X position is given by dividing the difference in the X1 and X2 currents by their sum. The Y position is given by dividing the difference in the Y1 and Y2 currents by their sum. These calculations are performed by analog circuits, digital circuits, by software, or by a combination of these methods, as is well known in the art.

FOUR MODES OF OPERATION OF THE PRECISION POSITIONER

As a precision positioning or scanning device

The precision positioning device may be used to execute fine X-Y motions, which motions are sub-micron in precision, from a total range on the order of 2 mm. Motion patterns such as raster scanning can be carried out with precision. Motion is rapid and controlled by the feedback loop involving the built-in lateral effect cell sensor, or can be provided by a separate, external sensor which senses the work environment directly. The ability to execute fine motions has many applications in science and engineering.

As a variable compliance device

The device, when operating in a "regulator mode," attempts to maintain its commanded position. Any external forces tending to displace the device will be met by restoring forces generated by the servo controller. By varying the closed loop gain parameter (in the preferred embodiment this is done simply by changing coefficients in the computer control program) the compliance or stiffness of the device is varied. The natural compliance of the device in open-loop mode is determined by the spring constants of the flexure springs. In closed-loop mode, the compliance is programmed, and may range from much greater than to much less than the natural compliance, as well as equal to the natural compliance simulating open-loop mode. This property is extremely useful for tasks involving the fitting together of two or more mating parts, as in a robot assembly operation.

Relatively simple programming changes to computer 18 can be made to provide not only desired motions to armature 7, but also to control the compliance (resistance to repositioning of the armature 7). The flexure springs provide a basic compliance, which may be considered as zero resistance to repositioning.

Programming in a ratio change to the digital values provided to the analog-to-digital converter, compliance may be altered from zero resistance to repositioning to maximum resistance to repositioning. The resistance to repositioning may also be programmed to vary as a function of position (for example, higher near the limit of travel) or as a complex variable or logarithmic function.

Figure 6:
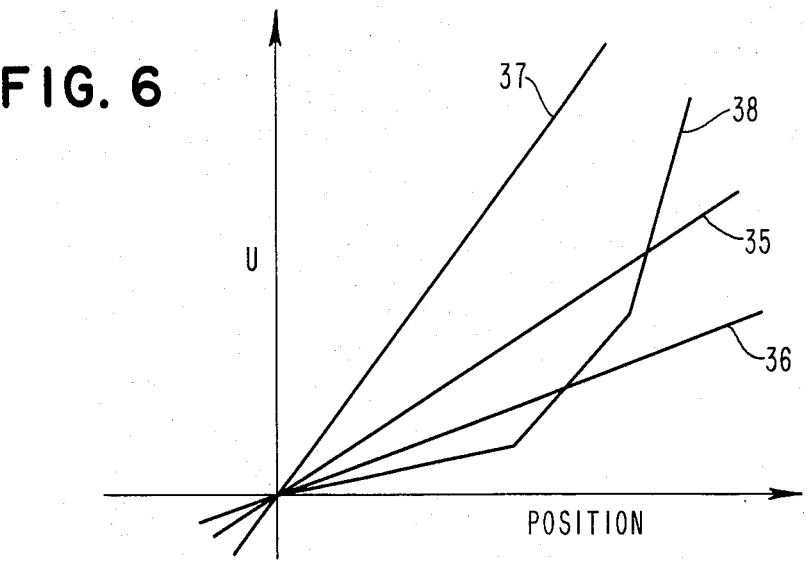
FIG. 6 is a graph showing nominal compliance and a set of programmable variations.

FIG. 6 illustrates graphically the effect of programming for different compliance values, in the form of force/travel slopes using position as the base variable. Line 35 shows nominal compliance provided by the flexure springs. Lower compliance values result in a lower force to position ratio as shown by line 36; higher compliance values result in a higher force to positio ratio, as shown by line 37. Complex compliance algorithms, sometimes required to protect mechanisms as limits of travel are approached, may be programmed according to complex algorithms, such as that resulting in force to travel ratios which change dramatically as threshold positions are reached, as shown by line 38.

As a variable forcing device

In some applications, it is desirable to exert known forces on a workpiece, as in pull-testing of electrical connector pins. In many cases, negligible motion occurs during the action of the force. The device is capable of exerting programmed forces, since the force exerted on the armature by the pole pieces is proportional to the current flowing through the coils, and the spring flexure force is linearly related to displacement from equilibrium.

As a measuring device

By virtue of its built-in position sensor, the device can be used as a passive measuring device, in a mode where the coil drive currents are disabled. Applications such as parts profiling can be accomplished by sensing the relationship between a mechanical probe or stylus attached to the moveable armature and the fixed part of the device. In this mode, attached to an external coarse positioner, the size and shape of parts can be determined.

In combination modes and applications

Since the device incorporates digital control, operation can be switched between the various modes described above as may be necessary to perform a given task. Applications include circuit board and chip probing, linear stepping motor interpolators, scanning microscopy and general laboratory investigations.

Alternative Embodiments

For a different order of precision, a quad cell may be used instead of the lateral effect cell. The quad cell has checkerboard plates instead of electrodes; a beacon light beam centered at the intersection of four plates provides a null at a home position. The quad cell is very precise for a single position; the lateral effect cell is accurate over a larger range of positions. Electromechanical or electromagnetic devices or other position sensors may be used where appropriate.

Figure 7:
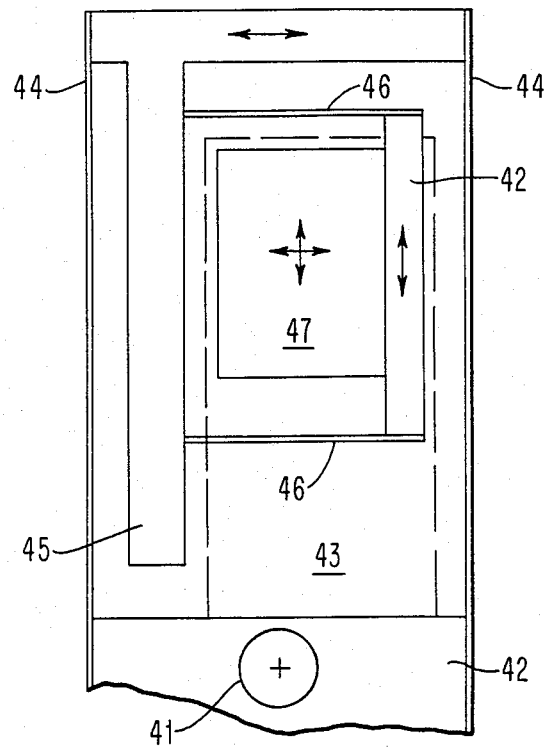
FIG. 7 is a plan view of an alternative embodiment of the precision positioner, in which the friction-free armature support has been rearranged so as to eliminate any Z-motion.

FIG. 7 shows a box alternative to the basket configuration of FIG. 1. It eliminates Z motion but at a slight cost of added bulk due to cantilever platforms. Post 41 and base 42 hold stator 43 suspended below flexure springs 44. Cantilever platform 45 is suspended for free motion along its short axis as shown by the arrows. Cantilever platform 45 in turn carries flexure springs 46 which support armature 47, also in cantilever mode, providing armature 47 with free motion in both X and Y dimensions. Armature 47 is thus suspended over stator 43, without static friction and without Z-dimension changes related to repositioning. Other friction-free suspensions such as planar air bearings might be substituted for the load-bearing aspects of the flexure springs, so long as the armature and stator are juxtaposed for operation, position sensing apparatus is in place, and a computer servo loop is active. Other changes in form and detail will be apparent to those skilled in the art, without departing from the invention as claimed in the following claims.

I claim:
1. A precision positioner characterized by
   (a) stator means establishing a reference plane having a reference point;
   (b) armature means having a reference point, said armature means and said stator means together acting as motor means;
   (c) armature support means comprising a basket of two sets of flexure springs suspending said armature from said stator via an intervening spring carrier, establishing said armature in space with freedom of motion in X and Y dimensions about the reference point in an armature plane parallel and close to the reference plane;
   (d) armature position sensing means, mounted on said armature means and said stator means at their respective reference points, for sensing the position of said armature;
   (e) control computer means;
   (f) feedback means connecting said armature position sensing means to said control computer means; and
   (g) motor control servo means connecting said control computer means and said motor means operatively so as to provide repositioning power to said armature.

2. A precision positioner according to claim 1 further characterized in that
   said armature support means is a box supporting said armature cantilevered above said stator by two sets of flexure springs via an intervening cantilever spring carrier.

3. A precision positioner characterized by
   (a) stator means defining a reference plane having an included reference beacon point;

(b) spring carrier means, positioned movably with respect to said stator means, in a spring carrier plane essentially parallel to said reference plane;

(c) a set of spring carrier supporting flexure springs mounting said spring carrier means in said spring carrier platform plane;

(d) a set of spring carrier supported flexure springs, mounted to said spring carrier means;

(e) armature means, mounted on said spring carrier supported flexure springs in a plane substantially parallel to the reference plane, operatively juxtaposed with said stator means;

(f) position sensing means, mounted on said armature means and said stator means so as to indicate instantaneous position of said armature;

(g) control computer means for providing operational control signals to said armature means and said stator means;

(h) position feedback means interconnecting said position sensing means (f) and said control computer means (g) in a servo loop;

whereby said armature means is selectively controllable for operations at its instantaneous position, including movement to a desired new position, under control of said control computer means (g) in accordance with a program for characterizing such operations.

4. A precision positioner according to claim 5 further characterized in that said stator means includes at least one permanent magnet, and for each permanent magnet, includes first and second coil-equipped pole pieces in mutually orthogonal planes, perpendicular to said reference plane, at acute angles totalling 90 degrees.

5. A precision positioner characterized by (a) stator means establishing a reference plane having a reference point;

(b) armature means having a reference point, said armature means and said stator means together acting as motor means;

(c) armature support means establishing said armature in space with freedom of motion in X and Y dimensions about the reference point in an armature plane parallel and close to the reference plane;

(d) armature position sensing means, mounted on said armature means and said stator means at their respective reference points, for sensing the position of said armature;

(e) control computer means;

(f) feedback means connecting said armature position sensing means to said control computer means;

(g) motor control servo means connecting said control computer means and said motor means operatively so as to provide repositioning power to said armature, comprising means for generating digital position error signals, and also comprising conversion means, responsive to said digital position error signals, for providing operating control currents for said motor means; and (h) variable compliance means, for controlling the compliance of said armature by varying the values of position control currents as a function of a compliance function variation formula.

6. A variable compliance precision positioner characterized by armature means, stator means and low-friction support means operative to maintain said armature means operably close and parallel to said rotor means to act as X-Y positioning motor means;

armature position sensing means;

computer means, programmable to provide position error/compliance statements defining motor control currents as a composite function of position error between armature means actual position and desired position and of selected compliance algorithm;

control servo means, responsive to said armature position sensing means and to said computer means, to provide to said motor means operating currents as a function of instantaneous position error/compliance statements provided by said computer means.

* * * * *